United States Patent
Ono et al.

(10) Patent No.: US 6,504,657 B1
(45) Date of Patent: Jan. 7, 2003

(54) OPTICAL MEMBER

(75) Inventors: Satoru Ono, Toyokawa (JP); Etsuko Shibata, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 737 days.

(21) Appl. No.: 08/900,985

(22) Filed: Jul. 25, 1997

(30) Foreign Application Priority Data

Jul. 25, 1996 (JP) .............................................. 8-196614

(51) Int. Cl.[7] .......................... G02B 13/18; G02B 27/02; G02B 7/02
(52) U.S. Cl. ........................ 359/711; 359/442; 359/440; 359/819; 264/1.1; 65/37; 65/39; 356/127
(58) Field of Search ................................. 359/440, 442, 359/711, 819; 356/127; 264/1.1; 65/37, 39, 323

(56) References Cited

U.S. PATENT DOCUMENTS 1,416,947 A * 5/1922 Dey ............................ 359/440
5,805,361 A * 9/1998 Morimoto et al. .......... 359/819

FOREIGN PATENT DOCUMENTS

JP 06-075181 3/1994

* cited by examiner

*Primary Examiner*—Evelyn A. Lester
(74) *Attorney, Agent, or Firm*—Sidley Austin Brown & Wood LLP

(57) ABSTRACT

An optical member having a toric functional surface has a marking which is made by a configuration of a mold used to form the optical member. The marking is formed in the optical member outside an effective area of the functional surface of the optical member. In one embodiment, the optical member is an optical member for a scanning optical system.

16 Claims, 3 Drawing Sheets

OPTICAL MEMBER

FIELD OF THE INVENTION

The present invention pertains to an optical member that is formed using a mold and which is primarily made of a resin, and more particularly, to an optical member that is used in a laser scanning optical system employed as a writing optical system in a laser printer or digital copying machine, for example.

BACKGROUND OF THE INVENTION

The optical member used in a scanning optical system in a number of instances is a resin molded lens because of the complexity of the functional surfaces, i.e., toric free-form surfaces. In the area of such resin optical members, a technology in which a protrusion indicating the molding information is formed on the plastic lens itself has been proposed as disclosed in Japanese Laid-Open Patent Application Hei 6-75181, for example.

However, the protrusion located on a conventional plastic lens is a code signal to read lot information used for lot control in accordance with which molding machine formed the lens and the location at which the protrusion is formed has no meaning in itself, and the protrusion is located on a surface that is not contiguous to the functional surface of the lens. Consequently, a problem arises as described below.

Using the information obtained from the protrusion on the lens, configuration or reference line discrepancies in the lens surface molded by the molding machine cannot be detected. Moreover, it is difficult to detect these discrepancies from the lens itself where the lens lacks any positional references having a specific relationship to the lens surface.

In other words, the protrusion provides locational information useful for the purpose of lot control only, and does not contribute to the measurement of variations among lenses in the same lot formed using the same molding machine. Making adjustments based on the protrusion may correct discrepancies between lots (molding machines), but cannot eliminate variations within the same lot. The protrusion does not contribute to the improvement of precision of the lens surface or of the position of the lens surface relative to reference positions.

Even if locational information to detect the discrepancies were formed on a surface that is not contiguous to the lens surface, as in the case of the protrusion in the conventional art (on the rib, top surface, bottom surface or side surface, for example), because the surface on which the protrusion would be located differs from the lens's functional surface in terms of the coefficient of contraction, the locational information would be easily affected by discrepancies created during formation. If necessary information regarding the configuration or positions were to be detected based on such information, errors would be included in the detection results.

As a result of this situation, in a lens configuration where the toric functional surface is asymmetrical with regard to a line, as in the case where the toric functional surface is a free-form surface, or in a mold that is used to form such a lens surface, the following is further desired.

In the processing of the cores, which are the molds to form the lens's functional surfaces, since some molds are designed to be asymmetrical, or where the mold is designed to be symmetrical, since there is a possibility that the formed lens's functional surface will be unable to fit the mold surface due to processing limitations, or that the functional surface will become asymmetrical due to the deformation during contraction, it is necessary to make clear at the time when the lens is evaluated the lateral orientation of the cores during processing.

In addition, during the measurement of the lens, it is important to accurately measure the configuration of the lens itself, without referring to the positional reference located on the outer circumferences not contiguous to the lens's functional surface, and is moreover necessary to accurately detect the distance between the reference position on the outer circumference and the central axis that should coincide with the lens's optical axis.

Further, it is necessary to confirm that the light path is located as designed when seen along the length and width of the lens surface and to make necessary adjustments when the optical member is assembled into the housing.

It is also necessary to remove any positional discrepancies when assembling the cores that comprise the molds to form the functional surfaces on the entry and exit sides of the lens.

SUMMARY OF THE INVENTION

The object of the present invention is to provide an optical member satisfying the requirements described above that permits accurate measurement of the lens surface as well as accurate assembly adjustment and confirmation.

In order to achieve the object described above, the optical member of the present invention is an optical member having a toric functional surface comprising a marking which is made by a configuration of a mold used to form the optical member and is formed outside an effective area of the functional surface of the optical member.

Using the construction described above, because the marking is formed outside the effective area of at least one functional surface of the optical member having a toric functional surface, i.e., on part of one functional surface subject to one coefficient of contraction, and are simultaneously formed using the same mold as the functional surface, the markings' positional relationship with the functional surface is determined almost unconditionally without being affected by the difference in coefficient of contraction among various parts of the optical member during formation or by discrepancies between the molds in terms of assembly position. Consequently, there are few discrepancies between the molding surface and the molded surface.

Another aspect of the present invention is an optical member having a toric functional surface for a scanning optical system comprises a marking which is made by a configuration of a mold used to form the optical member which is formed outside an effective area of scanning lens surfaces of the optical member.

Using the construction described above, a marking is formed outside the effective area of the scanning lens surface. Using the markings formed corresponding to the configuration of the molding surface as measurement references, the complex three-dimensional configuration of the toric functional surface of the optical member used for a scanning optical system, as well as the position at which the optical member should be placed, may be easily determined and appropriate adjustments may be made, as in the case of the construction described above.

BRIEF DESCRIPTION OF THE DRAWINGS

These and other objects and features of this invention will become clear from the following description, taken in conjunction with the preferred embodiments with reference to the accompanied drawings in which.

DETAILED DESCRIPTION OF THE PREFERRED EMBODIMENTS

The embodiments of the present invention are explained below with reference to the drawings.

Embodiment 1

Figure 1A:
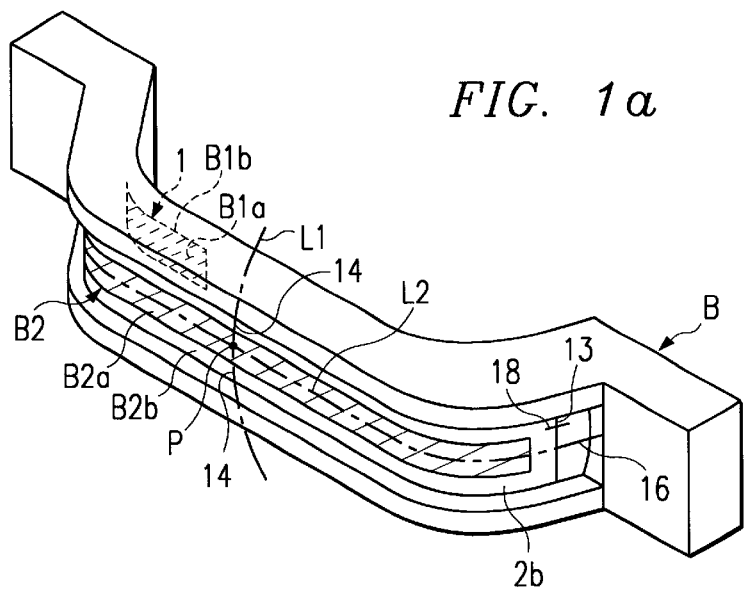
FIG. 1(a) is a perspective view of an optical member which corresponds to a first embodiment of the present invention.
Figure 1B:
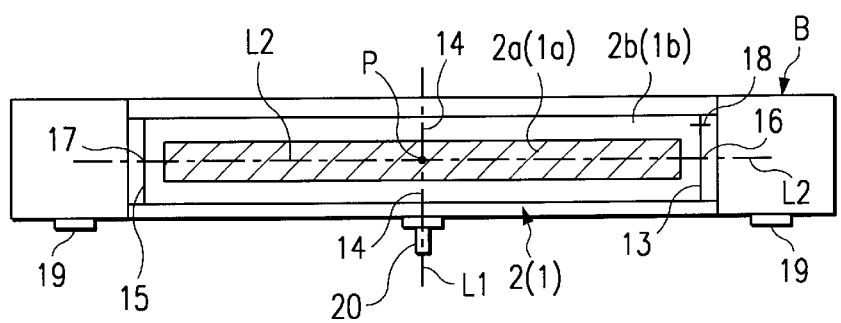
FIG. 1(b) is a plus view of an optical member which corresponds to the first embodiment of the present invention.
Figure 2:
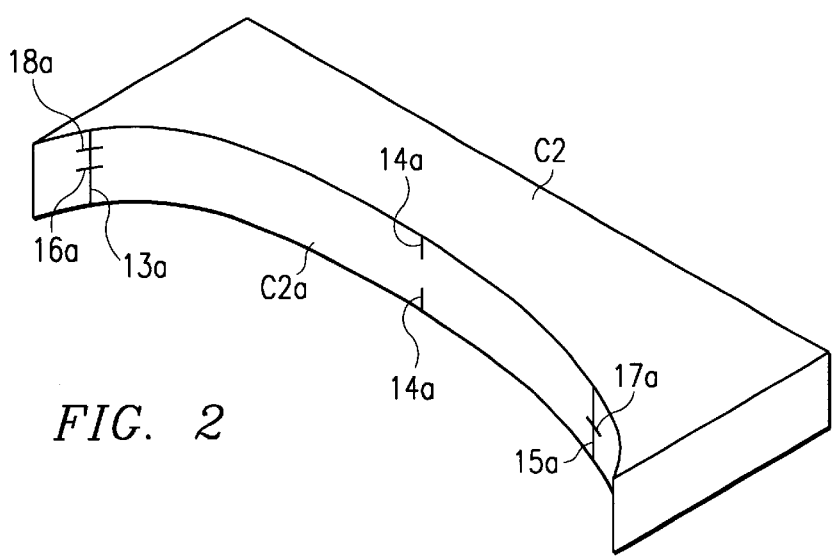
FIG. 2 is a perspective view of a mold used to form the lens surface of the optical member shown in FIGS. 1(a) and 1(b)
Figure 3:
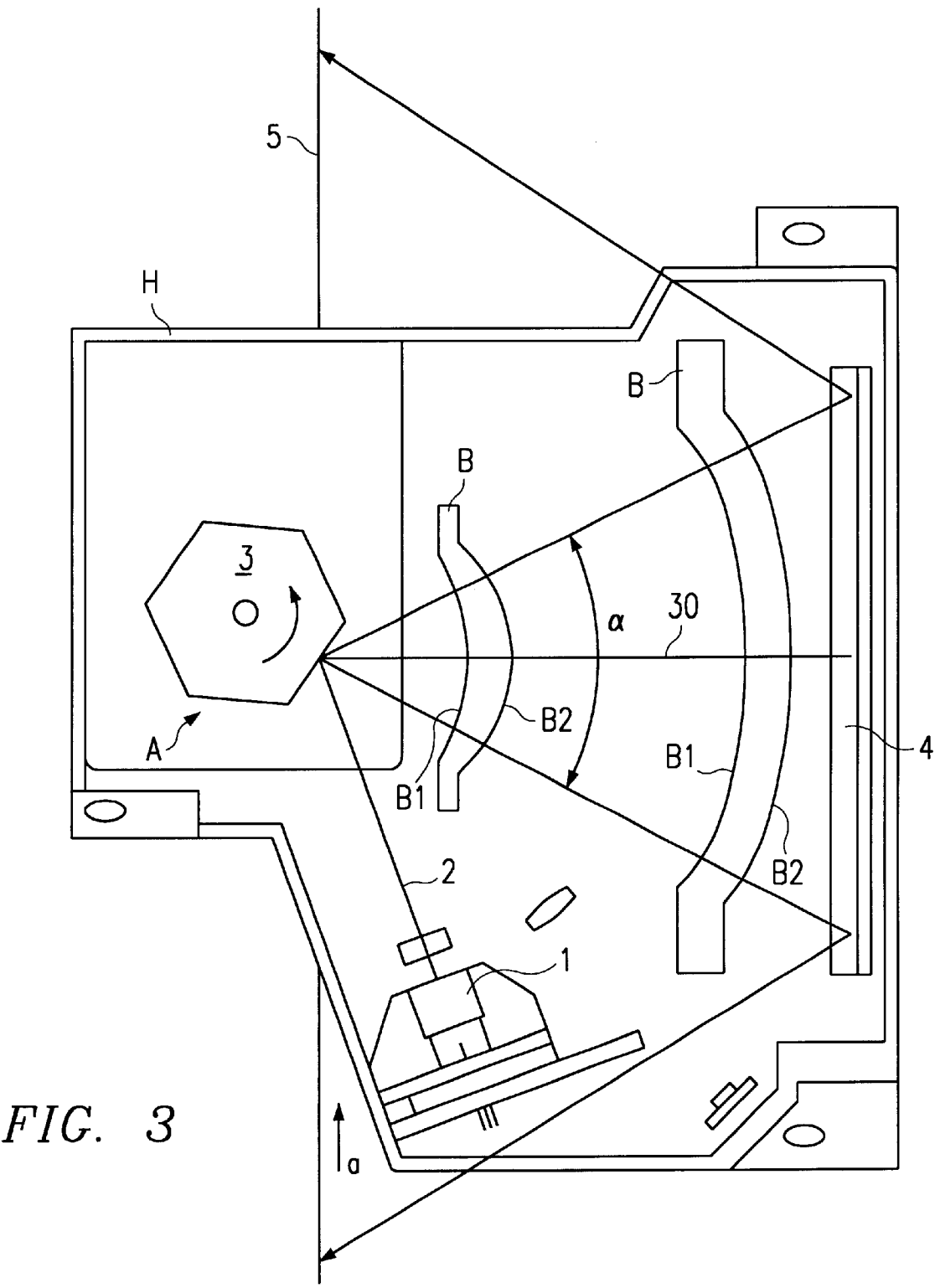
FIG. 3 is a perspective view of a scanning optical system unit in which the optical member shown in FIGS. 1(a) and 1(b) is used.

Embodiment 1 of the present invention is shown in FIGS. 1(a) through 4(b). It comprises optical member B as shown in FIG. 3, which is employed in scanning optical system A of a laser printer and which has a toric functional surface as well as an fθ characteristic. More than one optical members B are used in Embodiment 1 of the present invention. However, this number may be freely set. It may be one or a construction in which optical member B is combined with a different optical member which does not have a toric functional surface.

The laser printer shown in FIG. 3 deflects, within a prescribed range α, laser beam 2 emitted from laser light source 1 and modulated based on image signals by means of polygonal mirror 3 inside housing H. This deflected laser beam 2 is led to photosensitive member 5, a recording medium located outside housing H, by means of mirror 4, and scans photosensitive member 5 in the main scanning direction indicated by arrow "a" in FIG. 3. Then, optical member B uses its lenslike property to sequentially form an image of the deflected laser beam 2 on the scanning positions on photosensitive member 5, so that the deflected laser beam 2 scans photosensitive member 5 at a constant speed due to the fθ characteristic.

Photosensitive member 5 is exposed to the image while being moved in the secondary scanning direction, which is perpendicular to the main scanning direction, by repeatedly receiving the main scanning, and an electrostatic latent image corresponding to the image signals is formed. The electrostatic latent image on photosensitive member 5 is then developed using toner. The toner image following development is then transferred onto recording paper that is fed (not shown in the drawing). Fixing takes place with regard to the paper after the transfer, whereupon image formation is completed.

Figure 4A:
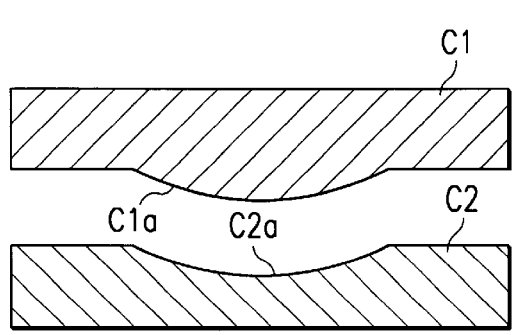
FIGS. 4(a) and 4(b) are, respectively, a plan view of the cores, which are the molds to form the entry side and exit side functional surfaces of the optical member shown in FIGS. 1(a) and 1(b), and a cross-sectional view showing a combination mold comprising these cores, to form the entire optical member.
Figure 4B:
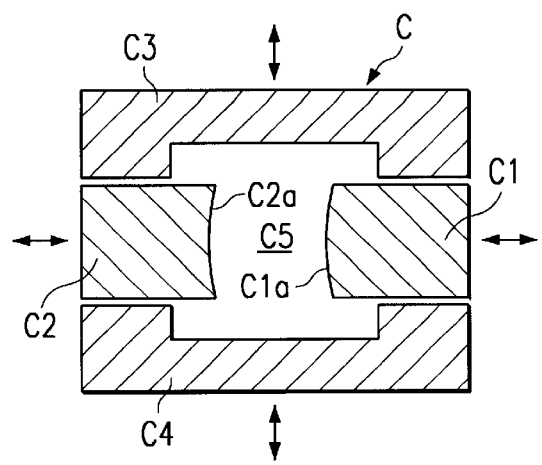

Optical member B is made of a resin. As shown in FIG. 1, it has lens surface B1, a functional surface on the laser beam 2 entry side, and lens surface B2, a toric functional surface on the exit side. Both lens surfaces B1 and B2 are formed using mold surfaces C1a and C2a of molds C1 and C2 having plan view configurations shown in FIG. 4(a). To perform this formation, combination mold C shown in FIG. 4(b) is used, the combination mold comprising molds C1 and C2 described above and molds C3 and C4 that close the top and bottom of cavity C5 and allow molds C1 and C2 to be inserted as cores from either side. A molten resin material is poured inside cavity C5 formed by molds C1 through C4 to form optical member B shown in FIGS. 1(a) and 1(b) via injection molding. Naturally, the mold to form optical member B need not be limited to this construction. In addition, the material of optical member B is not limited to synthetic resin either. The present invention may be applied to an optical member B made of any other material that can substitute for such resin.

Effective areas B1a and B2a of lens surfaces B1 and B2 through which laser beam 2 passes are located within the shaded slit-shaped areas shown in FIGS. 1(a) and 1(b). The surrounding areas outside these areas are non-effective areas B1b and B2b. In Embodiment 1 of the present invention, lens surface B2 on the exit side is a free-form surface that works as a toric functional surface. Line markings 13 through 18 as shown in FIGS. 1(a) and 1(b) are formed on non-effective area B2b by means of the configuration of wall surface C2a of mold C2 that molds lens surface B2 of optical member B. These markings are formed on non-effective area B2b of the lens by means of small marking-off lines 13a, 14a, 15a, 16a and 18a formed on wall surface C2a of mold C2. Naturally, it is acceptable if markings 13 through 18 are not formed using marking-off lines.

Markings 13, 14 and 15 are markings that work as positional references along the length of optical member B coinciding with the main scanning direction. Markings 14 are located in the center of effective area B2a along the main scanning direction. Line L1 obtained by connecting top and bottom markings 14 that sandwich effective area B2a becomes the locus of the surface apex of lens surface B2 in cross-sections of optical member B along the main scanning direction. Markings 16 and 17 are located in the center of effective area B2a along the secondary scanning direction. Line L2 obtained by connected left and right markings 16 and 17 that sandwich effective area B2a becomes the locus of the surface apex of lens surface B2 in cross-sections of optical member B along the secondary scanning direction. This line L2 is the bus-line of lens surface B2 and reference line L1 becomes the reference line that indicates the center in terms of the main scanning direction that is perpendicular to bus-line L2. The intersection of reference line L1 and bus-line L2 is surface apex P of lens surface B2, where the optical axis will be.

As described above, if markings 13 through 17 are formed as small line markings that have specific orientations, it is convenient for carrying out the necessary positioning with less deviation. As in the case of Embodiment 1 of the present invention, where top and bottom markings 14 and 14 and left and right markings 16 and 17 are located at positions in non-effective area B2b of lens surface B2 sandwiching effective area B2a in pairs, bus-line L2 and reference line L1 may be directly and precisely set on the functional surface by connecting markings 14 and 14 and markings 16 and 17, without affecting effective area B2a of the toric functional surface, and be used for various determinations and positioning.

It is acceptable for one of top and bottom markings 14 and 14 or one of left and right markings 16 and 17 to be omitted. Reference line L1 and bus-line L2 may be obtained by drawing a line that coincides with the remaining marking and has a prescribed orientation.

Lens surface B2 of optical member B pertaining to Embodiment 1 of the present invention is asymmetrical with regard to reference line L1 or bus-line L2. Marking 18 is used to confirm the lateral orientation of mold C2 used to form lens surface B2. Where the surface is not symmetrical with regard to reference line L1, it is particularly necessary that the lateral orientation be confirmed. This marking 18 has a different purpose from markings 13 through 17. Since it is not necessary for it to be formed at a precise position or to be oriented in a specific direction, it is not necessary to form it as a line.

Where lens surface B2 is measured, by performing measurement with reference to reference line L1 or bus-line L2 obtained based on markings 13 through 17 formed in non-effective area B2b of lens surface B2, instead of using lens positioning members 19 and 20 on the outer circumference, comparison with the core configuration of mold C2 shown in FIG. 2, i.e., mold surface C2a, may be carried out accurately. Consequently, correction, etc., of mold surface C2a of mold C2 may be appropriately performed.

In addition, in making adjustments during assembly of optical member B into housing H, by adjusting the position of optical member B such that the luminous flux scanning height will coincide with the line connecting markings 16 and 17, deterioration in performance of optical member B due to inaccurate positioning may be reduced. The positional adjustment referred to here may be performed by manually operating a positioning screw that works on optical member B and is not shown in the drawings, or by manually adjusting the position of an adjustable holder that holds the lens and is not shown in the drawings. For these, known various position adjustment mechanisms may be employed.

The characteristics that are required of a lens having a toric functional surface, the free-form surface of optical member B used in a scanning optical system, include the fθ characteristic mentioned above (distortion), correcting abilities regarding the position of laser beam 2 on the scanning surface, such as the tilted surface error correcting characteristic, and characteristics regarding the curvature of field, the magnification and the beam spot diameter such as the beam intensity.

Parameters regarding these characteristics include, in a lens, the surface configuration, core thickness and refractive index. In Embodiment 1 of the present invention, emphasis is placed on the lens surface and its positional discrepancies.

There are cases in which, during formation of optical member B, lens surface B2 that is formed by means of mold surface C2a will not have exactly the same configuration as the mold surface, even if mold surface C2a does not contain any configuration errors.

In an extreme case, even where mold surface C2a is a free-form surface that is symmetrical with regard to reference line L1 or bus-line L2, lens surface 2a of optical member B that is formed sometimes becomes asymmetrical. This results from a complex combination of the position of the pouring gate for the molten resin, the poured amount, the pouring speed, the direction in which mold C2 was extracted, the position of mold C2, the position and timing of the extraction of mold C2, and the cooling conditions of the resin (temperature distribution, cooling time and rate of cooling).

The free-form lens surface B2 that comprises the toric functional surface of Embodiment 1 of the present invention is a surface in which the radius of curvature in the secondary scanning direction increases as the angle of view in the main scanning direction increases. The optical axis (surface apex P) (except for decentered lenses), bus-line L2 which is the locus of the surface apex in cross-sections along the secondary scanning direction, and reference line L1 that is the locus of the surface apex in cross-sections along the main scanning direction operate as references for the lens surface B2.

Therefore, lens surface 2a of optical member B formed using mold C2 may be made closer to the ideal surface by comparing the optical axis position, three-dimensional distances among markings 13 through 17, and the configurations of reference line L1 and bus-line L2 with those of mold surface C2a of mold C2 to detect and measure the discrepancies, and by controlling the configuration and position (three-dimensional or with regard to the three axes) of mold surface C2a, as well as other molding conditions.

When lens surface B2 has approached the ideal surface configuration, markings 16 and 17 should be used such that optical member B will be assembled in housing H of the printer in a manner that allows the beam to coincide with these markings 16 and 17 and such that surface apex P will coincide with optical axis 30 of scanning optical system A shown in FIG. 3.

In Embodiment 1 of the present invention, in particular, markings 13 through 18 are formed in non-effective area B2b which is included in the same surface as lens surface B2. In other words, in comparison with the situation in which the markings are formed on a surface other than the lens surface, markings 13 through 18 are formed at positions closer to effective area B2a of lens surface B2, which are therefore closer to effective area B2a of lens surface B2 in terms of formation conditions. The pouring and cooling conditions of the molten resin and the mold that forms effective area B2a and non-effective area B2b of lens surface B2 will be the same for lens surface B2 and markings 13 through 18.

Consequently, there is little formation discrepancy from effective area B2a of lens surface B2, and important reference positions such as reference line L1, bus-line L2 and surface apex P of lens surface 2a may be accurately detected. Based on these positions, discrepancies regarding the reference positions and configuration from mold surface C2a that corresponds to lens surface 2a may be accurately detected and adjustments may be made. In addition, determination with regard to the position of optical member B assembled in housing H and related adjustments may be easily performed based on these positional references as well.

Where lens surface B2 of optical member B pertaining to Embodiment 1 of the present invention is an asymmetrical surface with regard to reference line L1 or bus-line L2, and it is necessary to determine, during comparison between lens surface B2 and mold surface C2a, the lateral orientation of mold C2, such a determination may be easily made by comparing the position of marking 18 with mold C2's marking-off line 18a that formed marking 18. Therefore, no mistakes will be made in the comparison between the configuration of the formed lens surface B2 and that of the forming mold surface C2a.

Embodiment 2

Figure 5A:
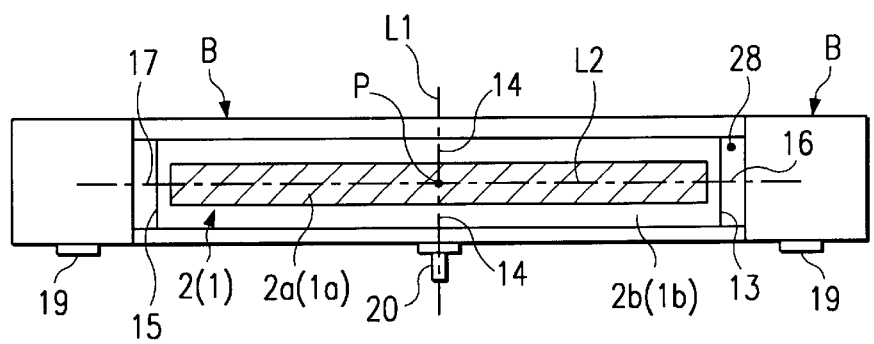
FIGS. 5(a) and 5(b) are, respectively, a plan view of an optical member corresponding to a second embodiment of the present invention, and a perspective view of part of a mold to form a functional surface of the optical member.
Figure 5B:
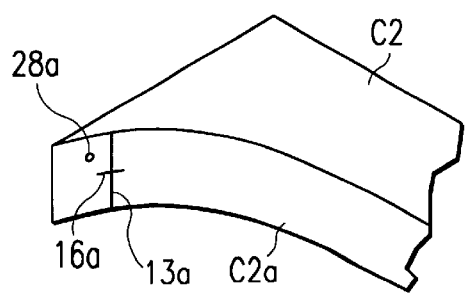

In Embodiment 2 of the present invention, dot marking 28 is formed on lens surface B2 of optical member B in place of line marking 18 of Embodiment 1, as shown in FIG. 5(a). Since the other components of the construction are the same as in Embodiment 1, the same numbers are used for the same members and parts, and their explanations will not be repeated. Dot marking 28 is formed at the same time that lens surface B2 is formed, by means of dot depression 28*a* formed via punching, etc., on mold surface C2*a* of mold C2 that forms lens surface B2.

Both Embodiments 1 and 2 aim at improving precision during formation of lens surface B2 of optical member B, but the same effect may be obtained by applying them in a mirror surface optical member B having a toric functional surface. This also is within the scope of the present invention.

Obviously, many modifications and variation of the present invention are possible in light of the above teachings. It is therefore to be understood that within the scope of the appended claims, the invention may be practiced other than as specifically described.

What is claimed is:

1. An optical member having a toric functional surface comprising:
   a marking which is made by a configuration of a mold used to form said optical member and is formed outside an effective area of the functional surface of said optical member, wherein said marking is a standard for measuring a configuration of the functional surface.

2. An optical member as claimed in claim 1, wherein said marking includes a first marking which indicates a reference position of a bus-line of said functional surface.

3. An optical member as claimed in claim 2, wherein said marking further includes a second marking which indicates a reference position of a line that is perpendicular to said bus-line of said functional surface.

4. An optical member as claimed in claim 1, wherein said marking includes a marking which indicates a reference position of a line that is perpendicular to a bus-line of said functional surface.

5. An optical member as claimed in claim 1, wherein said marking includes a pair of markings which are located in pairs outside the effective area of the functional surface.

6. An optical member having a toric functional surface for a scanning optical system comprising:
   a marking which is made by a configuration of a mold used to form said optical member and is formed outside an effective area of scanning lens surfaces of said optical member, wherein said marking is a standard for measuring a configuration of the functional surface.

7. An optical member as claimed in claim 6, wherein said marking includes a first marking which indicates a reference position of a bus-line of said scanning lens surfaces.

8. An optical member as claimed in claim 7, wherein said marking further includes a second marking which indicates a reference position of a line that is perpendicular to said bus-line of said scanning lens surfaces.

9. An optical member as claimed in claim 6, wherein said marking includes a marking which indicates a reference position of a line that is perpendicular to a bus-line of said scanning lens surfaces.

10. An optical member as claimed in claim 6, wherein said marking includes a pair of markings which are located in pairs outside the effective area of the scanning lens surfaces.

11. An optical member as claimed in claim 1, wherein said marking is formed asymmetrically on the functional surface.

12. An optical member as claimed in claim 6, wherein said marking is formed asymmetrically on the functional surface.

13. An optical member having a toric functional surface comprising:
    a small marking for discriminating a direction of the optical member, wherein said small marking is made by a configuration of a mold used to form said optical member and is formed outside an effective area of the functional surface of said optical member.

14. An optical member as claimed in claim 13, wherein said marking is formed asymmetrically on the functional surface.

15. An optical member having a toric functional surface for a scanning optical system comprising:
    a small marking for discriminating a direction of the optical member, wherein said small marking is made by a configuration of a mold used to form said optical member and is formed outside an effective area of the functional surface of said optical member.

16. An optical member as claimed in claim 15, wherein said marking is formed asymmetrically on the functional surface.

* * * * *